United States Patent
Carr et al.

(10) Patent No.: US 8,290,202 B2
(45) Date of Patent: Oct. 16, 2012

(54) METHODS UTILIZING STEGANOGRAPHY

(75) Inventors: J. Scott Carr, Carlisle, MA (US); Bruce L. Davis, Lake Oswego, OR (US); Geoffrey B. Rhoads, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 941 days.

(21) Appl. No.: 11/622,373

(22) Filed: Jan. 11, 2007

(65) Prior Publication Data

US 2007/0180251 A1 Aug. 2, 2007

Related U.S. Application Data

(63) Continuation-in-part of application No. 10/639,598, filed on Aug. 11, 2003, now abandoned, which is a continuation-in-part of application No. 10/367,092, filed on Feb. 13, 2003, now Pat. No. 7,113,615, which is a continuation-in-part of application No. 09/185,380, filed on Nov. 3, 1998, now Pat. No. 6,549,638, said application No. 10/639,598 is a continuation-in-part of application No. 09/465,418, filed on Dec. 16, 1999, now abandoned.

(60) Provisional application No. 60/112,955, filed on Dec. 18, 1998.

(51) Int. Cl.
*G06K 9/00* (2006.01)
(52) U.S. Cl. .................................. 382/100; 399/366
(58) Field of Classification Search ................... 382/100; 711/161; 399/366; 283/902
See application file for complete search history.

(56) References Cited

U.S. PATENT DOCUMENTS

| | | | |
|---|---|---|---|
| 4,297,729 A | 10/1981 | Steynor et al. |
| 4,528,588 A | 7/1985 | Lofberg |
| 4,547,804 A | 10/1985 | Greenberg |
| 4,807,031 A | 2/1989 | Broughton |
| 4,908,873 A | 3/1990 | Philibert et al. |
| 4,930,160 A | 5/1990 | Vogel et al. |
| 4,969,041 A | 11/1990 | O'Grady et al. |
| 5,040,059 A | 8/1991 | Leberl |
| 5,351,287 A | 9/1994 | Bhattacharyya et al. |
| 5,377,269 A | 12/1994 | Heptig et al. |
| 5,416,307 A | 5/1995 | Danek et al. |
| 5,436,974 A | 7/1995 | Kovanen |
| 5,444,779 A | 8/1995 | Daniele |

(Continued)

FOREIGN PATENT DOCUMENTS

EP 0789480 8/1997

(Continued)

OTHER PUBLICATIONS

Anderson, et al., "The Steganographic File System," Proc. 2nd. Int. Workshop on Information Hiding, Apr. 1998, 11 pages.

(Continued)

*Primary Examiner* — Jon Chang

(57) ABSTRACT

The present invention relates generally to steganography, digital watermarking and data hiding. In one embodiment a method is provided including: processing data representing content; analyzing the data to determine whether a plural-bit identifier is steganographically encoded therein, the plural-bit identifier encoded in the data through modifications to the data, the modifications steganographically hiding the presence of the plural-bit identifier; and upon detection of the plural-bit identifier, redundantly carrying out an action while attempting to conceal the action from one or more users of the content. Of course, other embodiments are described and claimed as well.

19 Claims, 2 Drawing Sheets

U.S. PATENT DOCUMENTS

| | | | |
|---|---|---|---|
| 5,450,490 A | 9/1995 | Jensen et al. | |
| 5,469,222 A | 11/1995 | Sprague | |
| 5,481,377 A | 1/1996 | Udagawa et al. | |
| 5,483,602 A | 1/1996 | Stenzel et al. | |
| 5,483,658 A | 1/1996 | Grube et al. | |
| 5,485,213 A * | 1/1996 | Murashita et al. | 375/240.12 |
| 5,499,294 A | 3/1996 | Friedman | |
| 5,515,451 A | 5/1996 | Tsuji et al. | |
| 5,533,144 A | 7/1996 | Fan | |
| 5,557,742 A | 9/1996 | Smaha et al. | |
| 5,568,550 A | 10/1996 | Ur | |
| 5,574,962 A | 11/1996 | Fardeau et al. | |
| 5,579,124 A | 11/1996 | Aijala et al. | |
| 5,602,906 A | 2/1997 | Phelps | |
| 5,610,688 A | 3/1997 | Inamoto et al. | |
| 5,613,004 A | 3/1997 | Cooperman et al. | |
| 5,629,990 A | 5/1997 | Tsuji et al. | |
| 5,636,292 A | 6/1997 | Rhoads | |
| 5,646,997 A | 7/1997 | Barton | |
| 5,652,626 A | 7/1997 | Kawakami et al. | |
| 5,652,802 A | 7/1997 | Graves et al. | |
| 5,671,277 A | 9/1997 | Ikenoue et al. | |
| 5,678,155 A | 10/1997 | Miyaza | |
| 5,687,236 A | 11/1997 | Moskowitz et al. | |
| 5,710,636 A | 1/1998 | Curry | |
| 5,727,092 A | 3/1998 | Sandford, II et al. | |
| 5,739,864 A | 4/1998 | Copeland | |
| 5,745,604 A | 4/1998 | Rhoads | |
| 5,748,763 A | 5/1998 | Rhoads | |
| 5,751,854 A | 5/1998 | Saitoh et al. | |
| 5,752,152 A | 5/1998 | Gasper et al. | |
| 5,761,686 A | 6/1998 | Bloomberg | |
| 5,768,426 A | 6/1998 | Rhoads | |
| 5,774,452 A | 6/1998 | Wolosewicz | |
| 5,790,693 A | 8/1998 | Graves et al. | |
| 5,790,697 A | 8/1998 | Munro et al. | |
| 5,790,932 A | 8/1998 | Komaki et al. | |
| 5,796,869 A | 8/1998 | Tsuji et al. | |
| 5,822,360 A | 10/1998 | Lee et al. | |
| 5,822,436 A | 10/1998 | Rhoads | |
| 5,838,814 A | 11/1998 | Moore | |
| 5,850,481 A | 12/1998 | Rhoads | |
| 5,892,900 A | 4/1999 | Ginter et al. | |
| 5,901,224 A | 5/1999 | Hecht | |
| 5,905,800 A | 5/1999 | Moskowitz et al. | |
| 5,905,810 A | 5/1999 | Jones et al. | |
| 5,974,548 A | 10/1999 | Adams | |
| 5,982,956 A | 11/1999 | Lahmi | |
| 5,987,127 A | 11/1999 | Ikenoue et al. | |
| 6,026,193 A | 2/2000 | Rhoads | |
| 6,073,123 A | 6/2000 | Staley | |
| 6,122,392 A | 9/2000 | Rhoads | |
| 6,131,162 A | 10/2000 | Yoshiura et al. | |
| 6,182,218 B1 | 1/2001 | Saito | |
| 6,185,312 B1 | 2/2001 | Nakamura et al. | |
| 6,185,321 B1 | 2/2001 | Fukushima et al. | |
| 6,216,228 B1 | 4/2001 | Chapman | |
| 6,233,684 B1 | 5/2001 | Stefik et al. | |
| 6,246,775 B1 * | 6/2001 | Nakamura et al. | 382/100 |
| 6,249,870 B1 | 6/2001 | Kobayashi et al. | |
| 6,256,110 B1 | 7/2001 | Yoshitani | |
| 6,266,430 B1 | 7/2001 | Rhoads | |
| 6,278,807 B1 | 8/2001 | Ito et al. | |
| 6,282,654 B1 | 8/2001 | Ikeda et al. | |
| 6,285,774 B1 | 9/2001 | Schumann et al. | |
| 6,285,776 B1 | 9/2001 | Rhoads | |
| 6,289,108 B1 | 9/2001 | Rhoads | |
| 6,314,518 B1 | 11/2001 | Linnartz | |
| 6,330,335 B1 | 12/2001 | Rhoads | |
| 6,343,138 B1 | 1/2002 | Rhoads | |
| 6,345,104 B1 * | 2/2002 | Rhoads | 382/100 |
| 6,353,672 B1 | 3/2002 | Rhoads | |
| 6,363,159 B1 | 3/2002 | Rhoads | |
| 6,384,935 B1 | 5/2002 | Yamazaki | |
| 6,389,055 B1 | 5/2002 | August et al. | |
| 6,389,151 B1 | 5/2002 | Carr et al. | |
| 6,400,827 B1 | 6/2002 | Rhoads | |
| 6,404,898 B1 | 6/2002 | Rhoads | |
| 6,408,082 B1 | 6/2002 | Rhoads et al. | |
| 6,424,726 B2 | 7/2002 | Nakano et al. | |
| 6,427,020 B1 | 7/2002 | Rhoads | |
| 6,430,302 B2 | 8/2002 | Rhoads | |
| 6,442,284 B1 | 8/2002 | Gustafson et al. | |
| 6,449,377 B1 * | 9/2002 | Rhoads | 382/100 |
| 6,449,379 B1 | 9/2002 | Rhoads | |
| 6,456,393 B1 | 9/2002 | Bhattacharjya et al. | |
| 6,496,591 B1 | 12/2002 | Rhoads | |
| 6,499,105 B1 | 12/2002 | Yoshiura et al. | |
| 6,519,352 B2 | 2/2003 | Rhoads | |
| 6,522,771 B2 | 2/2003 | Rhoads | |
| 6,535,618 B1 | 3/2003 | Rhoads | |
| 6,539,095 B1 | 3/2003 | Rhoads | |
| 6,542,618 B1 | 4/2003 | Rhoads | |
| 6,542,620 B1 | 4/2003 | Rhoads | |
| 6,549,638 B2 | 4/2003 | Davis | |
| 6,556,688 B1 | 4/2003 | Ratnakar et al. | |
| 6,560,349 B1 | 5/2003 | Rhoads | |
| 6,567,534 B1 | 5/2003 | Rhoads | |
| 6,567,535 B2 | 5/2003 | Rhoads | |
| 6,567,780 B2 | 5/2003 | Rhoads | |
| 6,574,350 B1 | 6/2003 | Rhoads et al. | |
| 6,580,819 B1 | 6/2003 | Rhoads | |
| 6,587,821 B1 | 7/2003 | Rhoads | |
| 6,590,997 B2 | 7/2003 | Rhoads | |
| 6,647,129 B2 | 11/2003 | Rhoads | |
| 6,654,480 B2 | 11/2003 | Rhoads | |
| 6,654,887 B2 | 11/2003 | Rhoads | |
| 6,675,146 B2 | 1/2004 | Rhoads | |
| 6,724,912 B1 | 4/2004 | Carr et al. | |
| 6,738,495 B2 | 5/2004 | Rhoads et al. | |
| 6,744,907 B2 | 6/2004 | Rhoads | |
| 6,750,985 B2 | 6/2004 | Rhoads et al. | |
| 6,754,377 B2 | 6/2004 | Rhoads | |
| 6,757,406 B2 | 6/2004 | Rhoads | |
| 6,768,808 B2 | 7/2004 | Rhoads | |
| 6,771,796 B2 | 8/2004 | Rhoads | |
| 6,778,682 B2 | 8/2004 | Rhoads | |
| 6,804,379 B2 | 10/2004 | Rhoads | |
| 6,882,738 B2 | 4/2005 | Davis et al. | |
| 6,915,481 B1 | 7/2005 | Tewfik et al. | |
| 6,922,480 B2 * | 7/2005 | Rhoads | 382/137 |
| 6,944,298 B1 | 9/2005 | Rhoads | |
| 6,952,485 B1 | 10/2005 | Davidson et al. | |
| 6,959,100 B2 | 10/2005 | Rhoads | |
| 6,959,386 B2 | 10/2005 | Rhoads | |
| 6,968,072 B1 | 11/2005 | Tian | |
| 6,970,573 B2 | 11/2005 | Carr et al. | |
| 6,978,036 B2 | 12/2005 | Alattar et al. | |
| 6,983,051 B1 | 1/2006 | Rhoads | |
| 6,987,862 B2 | 1/2006 | Rhoads | |
| 6,993,152 B2 | 1/2006 | Patterson et al. | |
| 7,003,132 B2 | 2/2006 | Rhoads | |
| 7,020,304 B2 | 3/2006 | Alattar et al. | |
| 7,054,462 B2 | 5/2006 | Rhoads et al. | |
| 7,054,463 B2 | 5/2006 | Rhoads et al. | |
| 7,076,084 B2 | 7/2006 | Davis et al. | |
| 7,113,615 B2 | 9/2006 | Rhoads et al. | |
| 7,130,087 B2 | 10/2006 | Rhoads | |
| 7,181,022 B2 | 2/2007 | Rhoads | |
| 7,184,570 B2 | 2/2007 | Rhoads | |
| 7,224,819 B2 | 5/2007 | Levy et al. | |
| 7,228,427 B2 | 6/2007 | Fransdonk | |
| 7,239,734 B2 | 7/2007 | Alattar et al. | |
| 7,242,790 B2 | 7/2007 | Rhoads | |
| 7,263,203 B2 | 8/2007 | Rhoads et al. | |
| 7,266,217 B2 | 9/2007 | Rhoads et al. | |
| 7,269,275 B2 | 9/2007 | Carr et al. | |
| 7,286,684 B2 | 10/2007 | Rhoads et al. | |
| 7,305,117 B2 | 12/2007 | Davis et al. | |
| 7,313,253 B2 | 12/2007 | Davis et al. | |
| 7,321,667 B2 | 1/2008 | Stach | |
| 7,340,076 B2 | 3/2008 | Stach et al. | |
| 7,359,528 B2 | 4/2008 | Rhoads | |
| 7,372,976 B2 | 5/2008 | Rhoads et al. | |
| 7,415,129 B2 | 8/2008 | Rhoads | |
| 7,418,111 B2 | 8/2008 | Rhoads | |
| 7,424,132 B2 | 9/2008 | Rhoads | |

| | | |
|---|---|---|
| 7,499,564 B2 | 3/2009 | Rhoads |
| 7,499,566 B2 * | 3/2009 | Rhoads ......................... 382/100 |
| 7,532,741 B2 | 5/2009 | Stach |
| 7,536,555 B2 | 5/2009 | Rhoads |
| 7,539,325 B2 | 5/2009 | Rhoads et al. |
| 7,548,643 B2 | 6/2009 | Davis et al. |
| 7,555,139 B2 | 6/2009 | Rhoads et al. |
| 7,567,686 B2 | 7/2009 | Rhoads |
| 7,567,721 B2 | 7/2009 | Alattar et al. |
| 7,570,784 B2 | 8/2009 | Alattar |
| 7,587,601 B2 | 9/2009 | Levy et al. |
| 7,602,940 B2 | 10/2009 | Rhoads et al. |
| 7,602,977 B2 | 10/2009 | Rhoads et al. |
| 7,606,390 B2 | 10/2009 | Rhoads |
| 7,639,837 B2 | 12/2009 | Carr et al. |
| 7,672,477 B2 | 3/2010 | Rhoads |
| 7,676,059 B2 | 3/2010 | Rhoads |
| 7,702,511 B2 | 4/2010 | Rhoads |
| 7,711,564 B2 | 5/2010 | Levy et al. |
| 7,720,249 B2 | 5/2010 | Rhoads |
| 7,720,255 B2 | 5/2010 | Rhoads |
| 7,724,919 B2 | 5/2010 | Rhoads |
| 7,769,202 B2 | 8/2010 | Bradley et al. |
| 7,787,653 B2 | 8/2010 | Rhoads |
| 7,796,826 B2 | 9/2010 | Rhoads et al. |
| 7,831,062 B2 | 11/2010 | Stach |
| 2001/0002827 A1 | 6/2001 | Yamazaki et al. |
| 2001/0017709 A1 | 8/2001 | Murakami et al. |
| 2001/0021144 A1 | 9/2001 | Oshima et al. |
| 2001/0021260 A1 | 9/2001 | Chung et al. |
| 2001/0022848 A1 | 9/2001 | Rhoads |
| 2001/0024510 A1 | 9/2001 | Iwamura |
| 2001/0026618 A1 | 10/2001 | Van Wie et al. |
| 2001/0042043 A1 | 11/2001 | Shear et al. |
| 2002/0021824 A1 | 2/2002 | Reed et al. |
| 2002/0021825 A1 | 2/2002 | Rhoads |
| 2002/0039314 A1 | 4/2002 | Yoshimura et al. |
| 2002/0041686 A1 | 4/2002 | Moriyama et al. |
| 2002/0054317 A1 | 5/2002 | Matsunoshita et al. |
| 2002/0054356 A1 | 5/2002 | Kurita et al. |
| 2002/0054692 A1 | 5/2002 | Suzuki et al. |
| 2002/0056081 A1 | 5/2002 | Morley et al. |
| 2002/0056118 A1 | 5/2002 | Hunter et al. |
| 2002/0059238 A1 | 5/2002 | Saito |
| 2002/0080995 A1 | 6/2002 | Rhoads |
| 2002/0085238 A1 | 7/2002 | Umenda |
| 2002/0097420 A1 | 7/2002 | Takaragi et al. |
| 2002/0107803 A1 | 8/2002 | Lisanke et al. |
| 2002/0136429 A1 | 9/2002 | Stach et al. |
| 2002/0191810 A1 | 12/2002 | Fudge et al. |
| 2003/0021440 A1 | 1/2003 | Rhoads |
| 2003/0084284 A1 | 5/2003 | Ando et al. |
| 2003/0138128 A1 | 7/2003 | Rhoads |
| 2004/0057581 A1 | 3/2004 | Rhoads |
| 2004/0181671 A1 | 9/2004 | Brundage et al. |
| 2004/0263911 A1 | 12/2004 | Rodriguez |
| 2005/0025463 A1 | 2/2005 | Bloom et al. |
| 2005/0111047 A1 | 5/2005 | Rhoads |
| 2006/0028689 A1 | 2/2006 | Perry et al. |
| 2006/0031684 A1 | 2/2006 | Sharma et al. |
| 2006/0062386 A1 | 3/2006 | Rhoads |
| 2006/0075244 A1 | 4/2006 | Schumann et al. |
| 2007/0016790 A1 | 1/2007 | Brundage et al. |
| 2007/0047766 A1 * | 3/2007 | Rhoads ......................... 382/100 |
| 2007/0172098 A1 | 7/2007 | Rhoads |
| 2007/0201835 A1 | 8/2007 | Rhoads |
| 2008/0131083 A1 | 6/2008 | Rhoads |
| 2008/0131084 A1 | 6/2008 | Rhoads |
| 2008/0149713 A1 | 6/2008 | Rhoads et al. |
| 2008/0240490 A1 | 10/2008 | Finkelstein et al. |
| 2008/0253740 A1 | 10/2008 | Rhoads |
| 2008/0275906 A1 | 11/2008 | Brundage |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027969 A1 | 2/2010 | Alattar |
| 2010/0040255 A1 | 2/2010 | Rhoads |
| 2010/0054529 A1 * | 3/2010 | Rhoads ......................... 382/100 |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |
| 2010/0226529 A1 * | 9/2010 | Rhoads ......................... 382/100 |

FOREIGN PATENT DOCUMENTS

| | | |
|---|---|---|
| EP | 1152592 | 11/2001 |
| EP | 1223742 | 7/2002 |
| WO | WO 95/04665 | 2/1995 |
| WO | WO 97/43736 | 11/1997 |
| WO | WO 01/06703 | 1/2001 |
| WO | WO 01/74053 | 10/2001 |
| WO | WO 02/03385 | 1/2002 |
| WO | WO 02/07150 | 1/2002 |
| WO | WO 02/29510 | 4/2002 |

OTHER PUBLICATIONS

Avcibas, et al., "Steganalysis of Watermarking Techniques Using Images Quality Metrics", Proceedings of SPIE, Jan. 2001, vol. 4314, pp. 523-531.

Bender et al., "Applications for Data Hiding," IBM Systems Journal, vol. 39, No. 3-4, 2000, pp. 547-568.

Debes et al., "Watermarking Scheme for Large Images Using Parallel Processing," Proc. of SPIE vol. 4314 (2001), pp. 26-34.

"Digital Fingerprinting Will Deter Pirates, Company Claims" Sep. 1, 1993, 1 page.

Gruhl, "Information Hiding to Foil the Casual Counterfeiter," Proc. 2.sup.nd Int'l Workshop on Information Hiding, Apr. 14-17, 1998, pp. 1-15.

"Major Studios to Participate in Test of Anti-Piracy Weopon," Oct. 1, 1993, 1 page.

Pfitzmann, "Trials of Traced Traitors," Proc. 1st Int. Workshop on Information Hiding, May/Jun. 1996, 16 pages.

Szepanski, "Additive binary Data Transmission for Video Signals," Conference of the Communications Engineering Society, 1980, NTG Technical Reports, vol. 74, pp. 343-351. (German text and English translation enclosed).

Szepanski, "A Signal Theoretic Method for Creating Forgery-Proof Documents for Automatic Verification," Proceedings 1979 Carnahan Conference on Crime Countermeasures, May 16, 1979, pp. 101-109.

Tirkel et al., "Electronic Water Mark," DICTA-93, Macquarie University, Sydney, Australia, Dec. 1993, 5 pages.

Wayer, Digital Copyright Protection, Academic Press, 1997, pp. 184-185.

U.S. Appl. No. 08/154,866, filed Nov. 18, 1993, Geoffrey B. Rhoads.
U.S. Appl. No. 08/215,289, filed Mar. 17, 1994, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis et al.
U.S. Appl. No. 09/496,380, filed Feb. 2, 2000, Geoffrey B. Rhoads.
U.S. Appl. No. 12/881,911, filed Sep. 14, 2010, Geoffrey B. Rhoads et al.

* cited by examiner

METHODS UTILIZING STEGANOGRAPHY

RELATED APPLICATION DATA

This application is a continuation-in-part of U.S. patent application Ser. No. 10/639,598, filed Aug. 11, 2003 (published as US 2006-0028689 A1).

The U.S. patent application Ser. No. 10/639,598 is a continuation-in-part of U.S. patent application Ser. No. 10/367,092, filed Feb. 13, 2003 (now U.S. Pat. No. 7,113,615), which is a continuation-in-part of U.S. patent application Ser. No. 09/185,380, filed Nov. 3, 1998 (now U.S. Pat. No. 6,549,638).

The U.S. patent application Ser. No. 10/639,598 is also a continuation-in-part of U.S. patent application Ser. No. 09/465,418, filed Dec. 16, 1999 (abandoned), which claims the benefit of U.S. Provisional Patent Application No. 60/112,955, filed Dec. 18, 1998.

The above U.S. patent documents are hereby incorporated by reference.

FIELD OF THE INVENTION

The present invention relates to computer systems, and more particularly relates to techniques for establishing persistent evidence of a computer's use for possibly illicit purposes (e.g. counterfeiting).

BACKGROUND AND SUMMARY OF THE INVENTION

Fifty years ago, counterfeiting was a rare art practiced by a small number of skilled engravers using esoteric equipment. Today, counterfeiting is a rampant problem practiced by thousands of criminals using ubiquitous computer equipment.

Statistics from the U.S. Secret Service illustrate the magnitude of the problem in the United States. In a recent report, the Secret Service stated:

> The amount of counterfeit currency passed in the United States over the last three fiscal years has remained fairly consistent; however, 1998 has seen a significant increase, largely due to inkjet produced counterfeits. Inkjet produced counterfeit currency comprised only 0.5% of the total counterfeit currency passed in fiscal year 1995. In comparison, 19% of the total counterfeit currency passed in the United States during fiscal year 1997 was inkjet produced, and 43% of the counterfeit currency passed through August 1998 has been ink jet counterfeit currency.
>
> This trend is attributed to rapid improvements in technology, and the ever-increasing availability and affordability of scanners, high-resolution inkjet and other output devices, and computer systems. Digital counterfeiting is likely to continue to increase as the capabilities of systems and devices continue to improve, and as these capabilities become more readily understood by the criminal element.
>
> Accompanying the Secret Service report was a table identifying the number of domestic counterfeiting plants raided, by type. Again, the explosive growth of inkjet counterfeiting is evident:

| Type of Counterfeiting Plant | FY95 | FY96 | FY97 | FY98 (through July) |
| --- | --- | --- | --- | --- |
| Offset Counterfeiting | 60 | 29 | 23 | 10 |
| Toner-Based Counterfeiting | 59 | 62 | 87 | 47 |
| Inkjet-Based Counterfeiting | 29 | 101 | 321 | 477 |

The problem is not limited to the United States; statistics from other countries show the above-detailed trends are worldwide.

Various means have been deployed over the years to deter the counterfeiting of banknotes and similar financial instruments. One is to incorporate design features in banknotes that are difficult to replicate. Another is to equip color photocopiers with the capability to recognize banknotes. If such a photocopier is presented with a banknote for duplication, copying is disabled or impaired.

Yet another approach is for color photocopiers to imperceptibly write their serial number on all output sheets, e.g. using small, light yellow lettering. (Such an arrangement is shown, e.g., in European laid-open application EP 554,115 and in U.S. Pat. No. 5,557,742.) While unknown to most of the public, the majority of color photocopiers employ this, or similar means, to mark all output copies with covert tracing data.

The inclusion of covert tracing data in all printed output from color photocopiers (and some color printers) brings into play the balancing of law enforcement needs versus the widely recognized users' rights of privacy and freedom of expression. Unbounded use of such covert marking techniques can raise the spectre of an Orwellian "Big Brother."

In accordance with a preferred embodiment of the present invention, tracer data is selectively generated to assist law enforcement agencies in prosecuting counterfeiters. However, instead of rotely incorporating such data into all printed output, it is secretly stored in the counterfeiter's computer. If the computer is later searched or seized, the tracer data can be recovered and employed as evidence of the computer's use in counterfeiting.

The foregoing and additional features and advantages of the present invention will be more readily apparent from the following detailed description, which proceeds with reference to the accompanying drawings.

DETAILED DESCRIPTION

Figure 1:
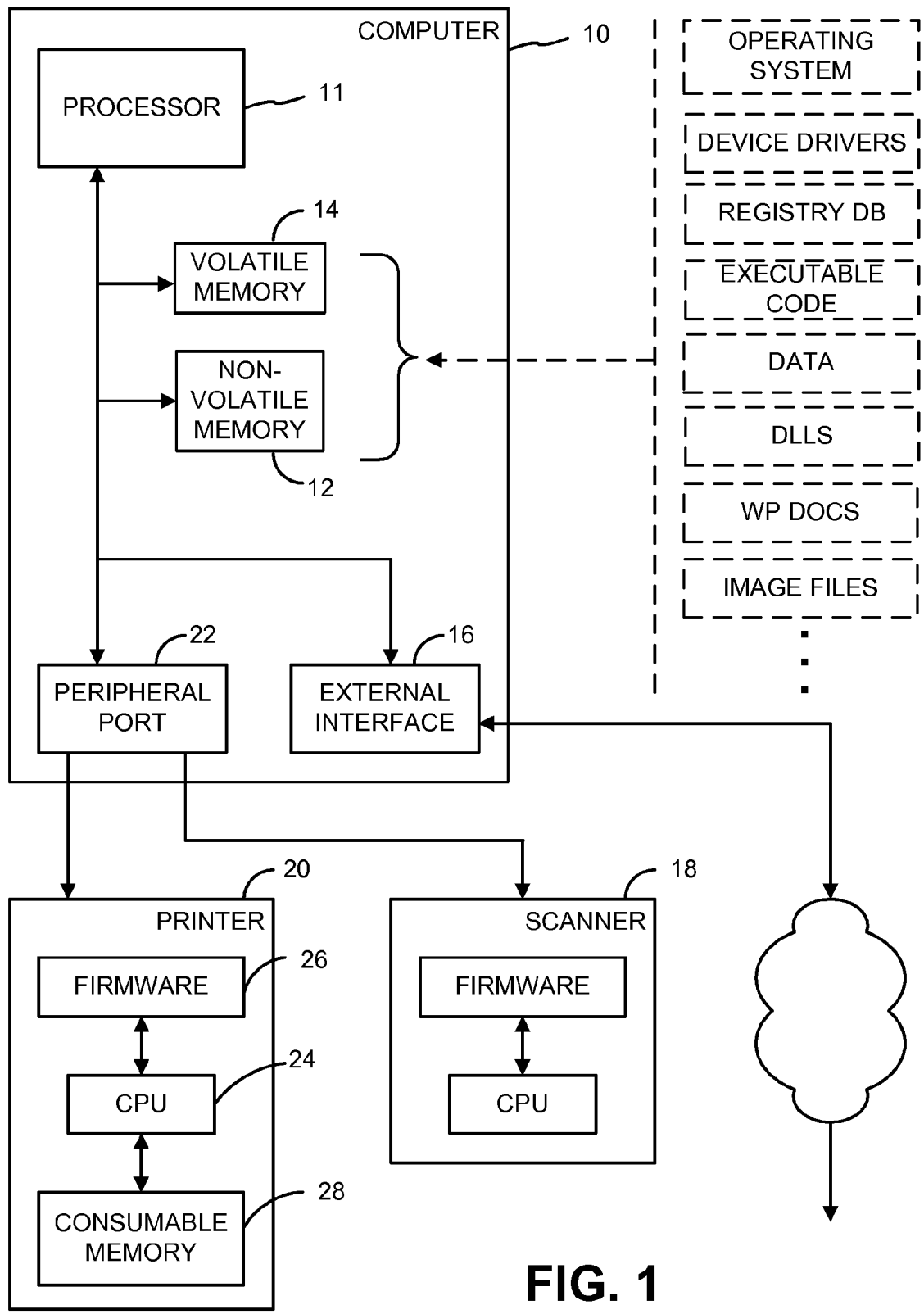
FIG. 1 is a diagram of a computer system according to one embodiment of the present invention.

Referring to FIG. 1, a computer system 10 employed in one embodiment of the present invention includes a processor 11, a non-volatile store 12, volatile memory 14, an external interface 16, and various peripherals (e.g. a scanner 18, a printer 20, etc.).

The processor 11 typically comprises a CPU, such as one of the microprocessors available from Intel, Sun, AMD, Cyrix, Motorola, MIPS, etc. Alternatively, the processor can take other forms, including hardwired logic circuitry, programmable logic (e.g. FPGAs), or yet-to-be-devised processing arrangements.

The non-volatile store 12 typically comprises a magnetic disk, but can also include other writeable media, including optical disks, flash memory, EEPROMS, ROMBIOS, etc. The non-volatile store can be physically located with the processor 11 (e.g. hard disk, CMOS memory with system setup data, etc), and/or can be remote (e.g. a networked drive, storage accessible over the Internet, etc.).

The volatile memory 14 typically comprises RAM, either integrated with the CPU (e.g. cache), and/or separate.

The external interface 16 can take various forms, including a modem, a network interface, a USB port, etc. Any link to a remote resource other than common peripherals is generally considered to employ an external interface.

Stored in the non-volatile store 12 is various software. This includes operating system software, applications software, and various user files (word processing documents, image files, etc.). The operating system software typically includes a thousand or more files, including a registry database (detailing the resources available in the system, etc.) and various device drivers (which serve as software interfaces between the CPU and peripheral devices, such as scanner 18 and printer 20). The applications software includes executable code and data. Both the operating system software and the applications software may employ shared files (e.g. DLLs) which can be utilized by different executables and/or operating system components to provide desired functionality.

While illustrated as resident in the non-volatile store 12, the foregoing software is generally loaded into the volatile memory 14 for execution.

The peripherals 18, 20 are typically connected to the computer system through a port 22 (e.g. serial, parallel, USB, SCSI, etc.) which permits bi-directional data exchange. Each peripheral typically includes its own processor circuitry 24 that operates in conjunction with firmware 26 (software resident in memory within the printer) to perform peripheral-specific processing and control functions. In addition to the memory in which the firmware is stored (e.g. EEPROM, flash memory, etc.), some peripherals have other data storage. For example, the disposable "consumables" in printers increasingly include their own non-volatile memories 28 in which various calibration and/or usage data is stored.

In one embodiment of the present invention, the computer system writes forensic tracer data (sometimes terms an "audit trail") to a non-volatile store if it detects a possibly illicit action, e.g. the processing of image data corresponding to a banknote. (For expository convenience, the term "banknote" is used to refer to all manner of value documents, including paper currency, travelers checks, money orders, stamps, university transcripts, stock certificates, passports, visas, concert—or sporting event tickets, etc.) The data is written in a manner(s), and/or to a location(s), chosen to minimize its possible detection by a cautious perpetrator. If the computer is later inspected pursuant to a lawful search and seizure, it can be analyzed for the presence of incriminating tracer data.

There is considerable prior work in the field of detecting security documents from image data. Published European application EP 649,114, for example, describes banknote detection techniques based on the use of fuzzy inferencing to detect geometrical arrays of certain patterns (sometimes termed "common marks") that are characteristic of banknotes. U.S. Pat. Nos. 5,515,451, 5,533,144, 5,629,990, and 5,796,869 describe banknote detection techniques based on different pattern matching techniques (e.g. to recognize the Federal Reserve seal). Xerox has also proposed its data glyph technology (detailed, e.g., in U.S. Pat. Nos. 5,706,364, 5,689, 620, 5,684,885, 5,680,223, 5,668,636, 5,640,647, 5,594,809) as a means to mark security documents for later machine-identification.

Another means for detecting security documents is by use of Hough-based pattern matching techniques as described, e.g., in Hough's U.S. Pat. No. 3,069,654, and Ballard, "Generalizing the Hough Transform to Detect Arbitrary Shapes," Pattern Recognition, Vol. 13, No. 2, pp. 111-122, 1981. One embodiment of such a system follows the approach outlined in the Ballard paper, and employs plural tables corresponding to different patterns found on banknotes, with different confidence. Gross Hough processing is first performed using one or more rotationally-invariant features (e.g. U.S. Federal Reserve Seal) to quickly identify most image sets as not banknote-related. Any data that looks to be potentially banknote related after the first check is subjected to successively more selective, higher-confidence tests (some stepping through plural rotational states) to weed out more and more non-banknote image sets. Finally, any image data passing all the screens is concluded to be, to a very high degree of certainty, a banknote. An appropriate signal is then generated (e.g. a change in state of a binary signal) to indicate detection of a banknote.

Neural networks and algorithms are also suitable for detection of patterns characteristic of banknotes, as illustrated by European patent EP 731,961, etc.

In the present assignee's prior applications (e.g. 08/649, 419, 09/074,034, 09/127,502, 60/082,228) techniques are disclosed for marking security documents with generally imperceptible, or steganographic, watermark data, so as to facilitate later identification of such documents. By employing digital watermark-based banknote detection in combination with visible feature-based banknote detection, very high confidence recognition of banknote data can be achieved.

The artisan is presumed to be familiar with the various approaches for recognizing banknotes from image data, of which the foregoing is just a sampling.

While such banknote-detection techniques are commonly implemented in resource-intensive form, using sophisticated processing units (e.g. the main CPU of a copier), this need not be the case. To reduce the resource requirements, the detection algorithm can be tailored to operate on parts of scan-line data, without buffering the entire set of image data for analysis. The algorithm can be implemented on less-sophisticated processors, such as those used in the scanner 18 or the printer 20. The processors can be programmed, by appropriate firmware, to perform such processing on any image data scanned by, or printed by, such devices. And as modems and other interfaces (SCSI, FireWire, IDE, ATAPI, etc.) continue their evolution from dedicated hardware to software-based implementations, their data processing capabilities increase commensurately. Thus, for example, software-implemented modems, network interfaces, UARTs, etc., can monitor the data traffic passing therethrough and flag any that appears to be banknote-related. The full analysis operation can be performed by the interface, or the data can be copied and passed to the main processor for further analysis.

In the preferred embodiment of the present invention, when banknote image data is detected, storage of forensic data is triggered. The forensic data typically includes at least the date (and optionally the time) at which the possibly illicit action occurred. Additionally, the forensic data can include the file name of the banknote image data (if available), and a code indicating the nature of the event noted (e.g., banknote data detected by the printer; banknote data detected passing through the modem on COM2; banknote data detected written to removable media having volume ID 01FF38; banknote data detected in file opened by Adobe Photoshop, etc.) The forensic data can additionally detail the source from which the data came, and/or the destination to which it was sent (e.g. IP/email addresses). In operating systems requiring user login, the stored forensic data will typically include the user ID. System status data can also be included, e.g. identifying peripheral devices attached to the system, code loaded into RAM memory, the amount of time the user spent working on the illicit data, etc. Selected data from any operating system registry database (e.g. identifying the registered owner of certain applications software then-loaded on the computer, software serial numbers, operational parameters, etc.) can likewise be included. If the computer is on a network or on the Internet, the network address, Ethernet MAC address, Apple-Talk name and zone, TraceRoute information, or IP address information can be stored. If the illicit action has been detected by reference to a watermark or other embedded data, payload data recovered from the watermark can be included in the forensic tracer data.

On one extreme, the foregoing (and possibly more) information can be stored in detailed forensic tracer records. At the other extreme, the forensic tracer record can comprise a single bit indicating that the computer system has been used—at least once—for a possibly illicit action.

Expecting that savvy counterfeiters will attempt to defeat such forensic tracer data, such data is desirably generated, transmitted, and stored redundantly, transparently, and inconspicuously.

Figure 2:
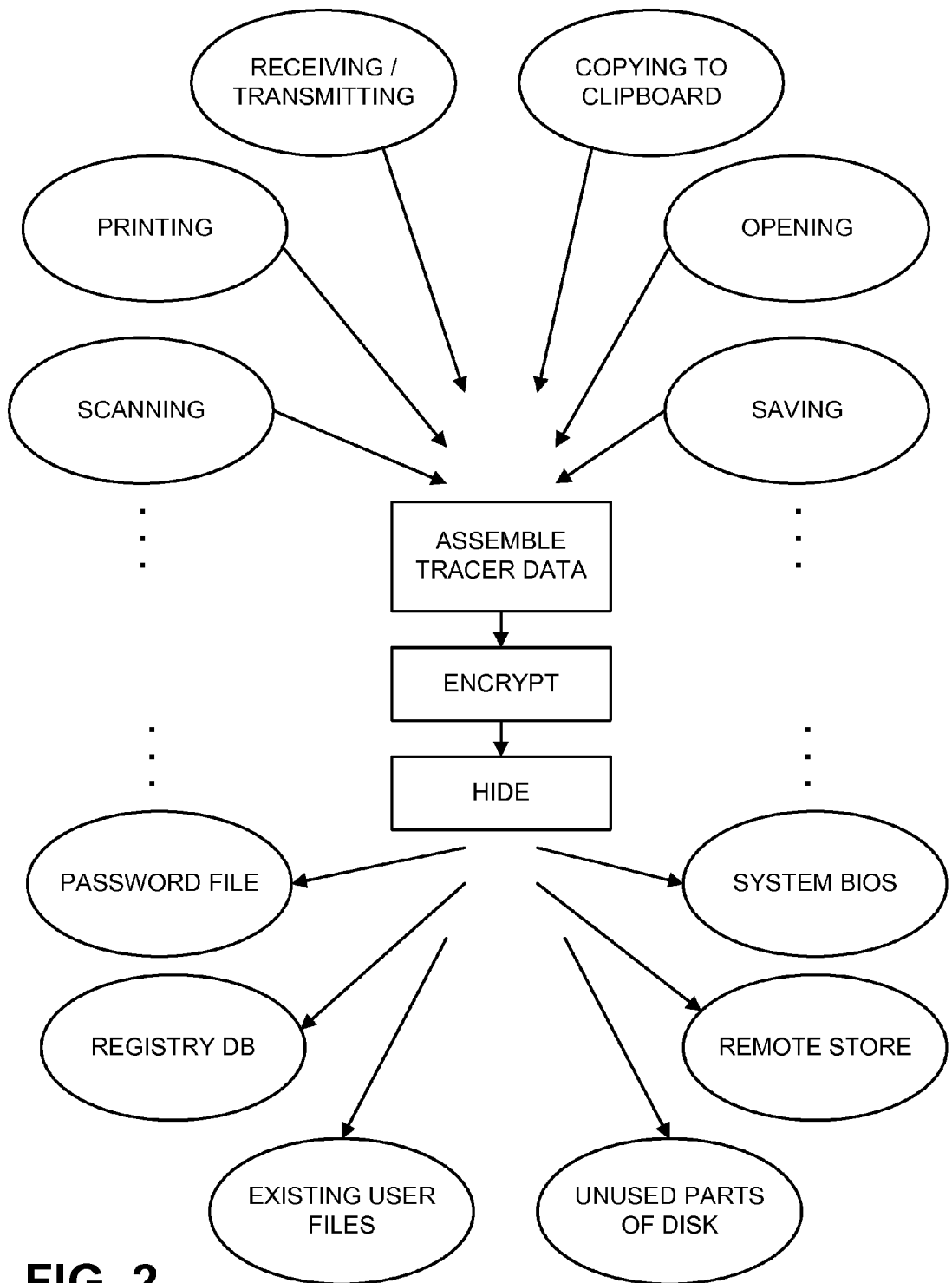
FIG. 2 is a diagram illustrating certain of the principles used in the FIG. 1 embodiment.

Redundant generation of the tracer data refers to detection of possibly illicit activity at various points in the computer system, and/or during various operations. Referring to FIG. 2, possibly illicit activity can be detected, e.g., during scanning of an image, printing of a document, receiving or transmitting a file through a modem connection, opening a file with an application program, saving a file with an application program, copying data to a clipboard, etc. By providing multiple opportunities for detection of possibly illicit activities, the robustness of the system is increased.

Redundant transmission of the tracer data refers to its transmission to storage media several times. When a possibly illicit activity is detected, it desirable to send tracer data to storage both immediately and on a delayed basis (e.g. five minutes after detection of banknote data, and every two minutes thereafter for a period of M minutes). By sending the data to storage repeatedly, the robustness of the system is again increased.

Redundant storage of the tracer data refers to its storage at several different locations (simultaneously or sequentially).

If even one instance of the redundantly generated/transmitted/stored tracer data survives the counterfeiter's attempts to redact incriminating data, it will be useful evidence in any prosecution.

Transparent generation/transmission/storage means that the acts associated with these operations will not arouse the counterfeiter's suspicion.

Various software tools are available to trace program execution. A savvy counterfeiter may employ such tools to monitor all disk writes performed by his system. Consider, for example, a counterfeiter using an image processing program in aid of his counterfeiting. The person may monitor the sequence of files opened and closed (and/or the data read/written) during use of the program for image processing with non-banknote data, and then be suspicious if different files, or in different orders, are opened and closed when performing the same image processing operations on banknote data. Thus, at least some of the forensic data should be stored using routine operations and routine files (e.g. writes to files that are used during normal program execution). Of course, such tracer data should be written in a manner assuring that the data will persist—either in the location originally written, or by copying during subsequent machine operation (e.g. on closing the application program, shutting down the operating system, etc.) to a location assuring longer-term availability.

Program-tracing tools typically monitor just the computer's main CPU so—where possible—at least some of the tracer data should be stored under the control of a different processing element, or in a location to which the tool's capabilities do not extend. Another option is to keep at least some of the tracer data in RAM memory for a period after the illicit action has been detected, and store it later.

Yet another option is to store at least some forensic tracer records in the operating system registry database. This resource is commonly accessed during system operation, so references to the database may not give rise to suspicion.

Inconspicuous storage covers a wide range of options. One is that the data be encrypted. This assures that simple disk-scanning operations attempting to find byte strings likely associated with tracer data will be unsuccessful. (Numerous encryption techniques are known, e.g. RSA, PGP, various private key techniques, etc., any of which can be used.)

Encrypted tracer data can be stored with other encrypted system data, such as in a password file. Due to its encrypted nature, a hacker may not be able to discern what part of the stored data is tracer data and what part is, e.g., password data. Attempts to redact the tracer data risks corrupting the password data, jeopardizing the counterfeiter's later ability to login to the machine.

Another possibility is to steganographically encode the tracer data, e.g. by randomizing/obfuscating same and inconspicuously hiding it amidst other data (e.g. within graphic or audio files associated with start-up or shut-down of the computer operating system, or wherever else noise-like data can be introduced without alerting the user to its presence). Still another possibility is to create null code that resembles normal instructions or data, but instead serves as a forensic tracer record.

To avoid creation of telltale new files in the non-volatile memory, the tracer data can be patched into existing files, by appending to the end or otherwise. Or, rather than storing the tracer data as the content of a file, the data can be stored among a file's "properties."

Another way to avoid creating new files is to avoid using the computer's "file system" altogether, and instead use low-level programming to effect direct writes to typically-unused or reserved physical areas on the disk. By such techniques, the data is resident on the disk, but does not appear in any directory listing. (While such data may be lost if disk optimization tools are subsequently used, those skilled in the art will recognize that steps can be taken to minimize such risks.)

Yet another way to avoid creating new files is to relay at least some of the tracer data to outside the computer. One expedient is to use an external interface to transmit the data for remote storage. Again, a great variety of techniques can be employed to reliably, yet effectively, effect such transmission. And the data transmission need not occur at the moment the possibly illicit action is occurring. Instead, such data can be queued and relayed away from the machine at a later time.

Still another way to avoid creating new files is to make use of deadwood files that commonly exist on most computers. For example, application programs typically employ installation utilities which copy compressed files onto the disk, together with code to decompress and install the software. These compressed files and installation programs are usually not deleted, providing opportunities for their use as repositories of tracer data. Similarly, many computers include dozens or hundreds of duplicate files—only one of which is commonly used. By converting one or more of these files to use as a repository for tracer data, additional inconspicuous storage can be achieved.

Some application programs include hundreds of files, various of which are provided just for the occasional use of the rare super-user. Files that pass some litmus test of inactivity (e.g. not ever used, or not accessed for at least two years) might serve as tracer data repositories. (Disk utilities are available to determine when a given file was last accessed.)

Yet another option is to append data to an application's Help files, or other binary data files used to save program state information for the application.

Resort may also be made to various of the known techniques employed in computer viruses to generate, transmit, store and disseminate/replicate the forensic tracer data in manners that escape common detection. Moreover, such virus techniques can be used to initially spread and install the functionality detailed above (i.e. pattern recognition, and tracer data generation/transmission/storage) onto computers without such capabilities.

Some embodiments may perform self-integrity checks of old tracer records each time a new banknote is encountered, and repair any damage encountered. Similarly, old tracer records can be expanded to detail new illicit acts, in addition to (or in lieu of) creating independent records for each illicit act.

Various tools can be used to replicate/propagate forensic tracer records to further infest the system with incriminating evidence. Utility software such as disk defragmenters, disk integrity checks, virus checkers, and other periodically-executed system maintenance tools can be written/patched to look in some of the places where forensic tracer records may be found and, if any are encountered, copy them to additional locations. Similar operations can be performed upon termination of selected application programs (e.g. image processing programs).

The foregoing is just the tip of the iceberg. Those skilled in the arts of computer programming, operating system design, disk utilities, peripheral firmware development, packet data transport, data compression, etc., etc., will each recognize many different opportunities that might be exploited to effect surreptitious, reliable banknote detection, and transmission, storage, and/or replication of tracer data. Again, if even one tracer record persists when the computer is searched by suitably-authorized law enforcement officials, incriminating evidence may be obtained. The high odds against ridding a computer of all incriminating data should serve as a deterrent against the computer's use for illegal purposes in the first place.

As noted, the computer system desirably includes several checkpoints for detecting illicit actions. In the case of banknote image processing, for example, detectors can be implemented in some or all of the following: in image processing software applications, in DLLs commonly used with image processing, in printer drivers, in printer firmware, in scanner drivers, in scanner firmware, in modem or other external interface drivers and software, in email software, in FTP software, in the operating system (looking at the clipboard, etc.), etc., etc. Similarly, where practical, the checking should be done by several different processors (e.g. main CPU, programmable interface chips, scanner microcontroller, printer microprocessor, etc.).

From the foregoing, it will be recognized that techniques according to the present invention can be used to discourage counterfeiting, and to aid in its prosecution when encountered. Moreover, this approach obviates the prior art approach of marking all color photocopies with tracer data, with its accompanying privacy and first amendment entanglements.

Having described and illustrated the principles of our invention with reference to an illustrative embodiment and several variations thereon, it should be recognized that the invention can be modified in arrangement and detail without departing from such principles.

For example, while the detailed embodiment has focused on a computer system, the same techniques can likewise be employed in stand-alone color copiers, etc.

Similarly, while the detailed embodiment has focused on counterfeiting, it will be recognized that computers can be employed in various other illicit or unauthorized activities. Each generally is susceptible to computer-detection (e.g. threats against the president may be detected by specialized natural language analysis programs; computer-aided synthesis of illegal drugs may be indicated by certain chemical modeling instructions in software specific to that industry; unauthorized duplication of copyrighted works may be flagged by the presence of embedded watermark data in the copyrighted work; unauthorized distribution of classified or confidential business documents may be detected using known techniques, etc.). The storage of forensic tracer data along the lines detailed above is equally applicable in such other contexts.

In the future, support for illicit activity detection may be routinely provided in a wide variety of software and peripherals. In one embodiment, the software and peripherals may include generic services supporting the compilation of forensic tracer data, its encryption, transmission, storage, etc. These generic services can be invoked by detector modules that are customized to the particular illicit/unauthorized activity of concern. Some of the detector modules can be fairly generic too, e.g. generic pattern recognition or watermark detection services. These can be customized by data loaded into the computer (either at manufacture, or surreptitiously accompanying new or updated software) identifying particular images whose reproduction is unauthorized/illicit. As new banknotes are issued, updated customization data can be distributed. (Naturally, such detector customization data will need to be loaded and stored in a manner that is resistant against attack, e.g. using the approaches outlined above for the covert tracer data.)

While the invention is described in the context of an end-user computer, the principles are equally applicable in other contexts, e.g. in server computers. Moreover, the principles are not limited to use in general purpose personal computers but can also be applied in other computer devices, e.g. digital cameras, personal digital assistants, set-top boxes, handheld devices, firewalls, routers, etc.

Although not belabored above, it will be understood that law enforcement agencies will have software recovery tools that can be employed on suspect computer systems to recover whatever forensic tracer data may persist. Briefly, such tools know where to look for tracer data and, when encountered, know how to interpret the stored records. After analyzing the non-volatile stores associated with a suspect computer system, the recovery software will report the results. The implementation of such tools is well within the capabilities of an artisan.

While the foregoing disclosure has focused exclusively on the storage of forensic tracer data as the response to a possibly-illicit action, more typically this is just one of several responses that would occur. Others are detailed in the previously-referenced documents (e.g. disabling output, hiding tracer data (e.g. as in U.S. Pat. No. 5,557,742, or using steganographically encoded digital watermark data) in the output, telephoning law enforcement officials, etc.).

To provide a comprehensive disclosure without unduly lengthening this specification, applicants incorporate by reference the patent applications and documents referenced above. By so doing, applicants mean to teach that the systems, elements, and methods taught in such documents find application in combination with the techniques disclosed herein. The particular implementation details of such combinations are not belabored here, being within the skill of the routineer in the relevant arts.

In view of the many possible embodiments in which the principles of our invention may be realized, it should be recognized that the detailed embodiments are illustrative only and should not be taken as limiting the scope of our invention. Rather, we claim as our invention all such modifications, combinations, and implementations as may come within the scope and spirit of the following claims, and equivalents thereof.

What is claimed is:

1. A method comprising:
    obtaining access to a set of data corresponding to an image or video;
    controlling a steganographic encoding detector to examine only a portion of the data, without examining the entire set of data,
    detecting plural-bit data from the portion of the data; and
    upon detection of the plural-bit data, carrying out an action based on the detected plural-bit data, wherein the plural-bit data indicates a possible use of a device for an illicit activity and wherein the action comprises storing or generating forensic data to identify the possible use or the illicit activity.

2. The method of claim 1, wherein the set of data comprises scan-line data, and wherein the detecting operates on only a portion of the scan-line data, without buffering the entire set of data for analysis.

3. A method comprising:
    obtaining data representing content;
    analyzing the data to determine whether a steganographic signal is encoded therein through modifications to the data, wherein the modifications are made so as to conceal the presence of the steganographic signal to a casual human observer of the content; and
    upon detection of the steganographic signal, redundantly carrying out an action that is concealed from a user of the content, wherein the steganographic signal indicates a possible use of a device for an illicit activity, and wherein the action comprises storing or generating forensic data to identify the possible use or the illicit activity.

4. The method of claim 3, wherein the content comprises an image or video.

5. The method of claim 3, wherein the steganographic signal comprises an identifier, and wherein the action comprises transmitting at least the identifier.

6. The method of claim 5, wherein the identifier is transmitted to a remote device.

7. The method of claim 3, wherein the steganographic signal comprises an identifier, and wherein the action comprises generating data.

8. The method of claim 3, wherein the steganographic signal comprises an identifier, and wherein the action comprises storing data.

9. The method of claim 8, wherein the data is remotely stored.

10. A method comprising:
    processing data representing content;
    analyzing the data to determine whether a plural-bit identifier is steganographically encoded therein through modifications to the data, wherein the modifications steganographically hide the plural-bit identifier;
    upon detection of the plural-bit identifier, redundantly carrying out an action while attempting to conceal the action from one or more users of the content, wherein the plural-bit identifier indicates a possible use of a device for an illicit activity and wherein the action comprises storing or generating forensic data to identify the possible use or the illicit activity.

11. The method of claim 10, wherein the action comprises transmitting at least the plural-bit identifier.

12. The method of claim 11, wherein the plural-bit identifier is transmitted to a remote device.

13. The method of claim 10, wherein the action comprises generating data.

14. The method of claim 10, wherein the action comprises storing data.

15. The method of claim 10, wherein the content comprises an image or video.

16. A device comprising:
    a memory configured to store data representing content; and
    a processor operatively coupled to the memory and configured to:
        analyze the data to determine whether a steganographic signal is encoded therein through modifications to the data, wherein the modifications are made so as to conceal a presence of the steganographic signal; and
        upon detection of the steganographic signal, carry out an action that is concealed from a user of the content, wherein the steganographic signal indicates a possible use of the device for an illicit activity, and wherein the action comprises storing or generating forensic data to identify the possible use or the illicit activity.

17. The device of claim 16, wherein the steganographic signal comprises an identifier, and further comprising a transmitter configured to transmit at least the identifier to a remote device.

18. A tangible computer-readable medium having instructions stored thereon, the instructions comprising:
    instructions to obtain data representing content; and
    instructions to analyze the data to determine whether a steganographic signal is encoded therein through modifications to the data, wherein the modifications are made so as to conceal a presence of the steganographic signal; and
    upon detection of the steganographic signal, instructions to carry out an action that is concealed from a user of the content, wherein the steganographic signal indicates a possible use of the device for an illicit activity, and wherein the action comprises storing or generating forensic data to identify the possible use or the illicit activity.

19. The tangible computer-readable medium of claim 18, wherein the steganographic signal comprises an identifier, and further comprising instructions to transmit at least the identifier to a remote device.

* * * * *

UNITED STATES PATENT AND TRADEMARK OFFICE
CERTIFICATE OF CORRECTION

| | | |
|---|---|---|
| PATENT NO. | : 8,290,202 B2 | Page 1 of 1 |
| APPLICATION NO. | : 11/622373 | |
| DATED | : October 16, 2012 | |
| INVENTOR(S) | : Carr et al. | |

It is certified that error appears in the above-identified patent and that said Letters Patent is hereby corrected as shown below:

On Page 3, in Field (56), under "OTHER PUBLICATIONS", in Column 2, Line 8, delete "Claims"" and insert -- Claims," --, therefor.

On Page 3, in Field (56), under "OTHER PUBLICATIONS", in Column 2, Line 13, delete "Weopon,"" and insert -- Weapon," --, therefor.

In Column 2, Line 61, delete "EEPROMS," and insert -- EEPROMs, --, therefor.

In Column 5, Line 30, delete "it desirable" and insert -- it is desirable --, therefor.

In Column 7, Line 31, delete "etc., etc.," and insert -- etc., --, therefor.

In Column 7, Line 32, delete "effect" and insert -- affect --, therefor.

In Column 7, Line 50, delete "etc.), etc., etc." and insert -- etc.), etc. --, therefor.

In Column 9, Line 15, in Claim 1, delete "data," and insert -- data; --, therefor.

In Column 10, Line 7, in Claim 10, delete "activity" and insert -- activity, --, therefor.

Signed and Sealed this
Second Day of April, 2013

Teresa Stanek Rea
*Acting Director of the United States Patent and Trademark Office*